United States Patent [19]

Aharoni

[11] 4,390,649

[45] Jun. 28, 1983

[54] INJECTION MOLDABLE POLY(ETHYLENE TEREPHTHALATE)

[75] Inventor: Shaul M. Aharoni, Morris Plains, N.J.

[73] Assignee: Allied Corporation, Morris Township, Morris County, N.J.

[21] Appl. No.: 349,781

[22] Filed: Feb. 18, 1982

[51] Int. Cl.³ .................... C08L 67/02; C08K 3/10
[52] U.S. Cl. ..................... 524/167; 524/413; 524/434; 524/437; 524/435; 260/DIG. 35; 524/292; 524/314
[58] Field of Search ............ 524/413, 434, 437, 435, 524/167, 292, 314; 525/176; 260/DIG. 35

[56] References Cited

U.S. PATENT DOCUMENTS

| | | | |
|---|---|---|---|
| 3,435,093 | 3/1969 | Cope | 525/176 |
| 3,575,931 | 4/1971 | Sherman | 524/434 |
| 3,583,935 | 6/1971 | Weissermel | 523/442 |
| 3,639,527 | 2/1972 | Brinkman | 525/176 |
| 3,673,139 | 6/1972 | Hrach | 260/DIG. 35 |
| 3,969,313 | 7/1976 | Aishima | 524/437 |
| 4,071,494 | 1/1978 | Gaylord | 524/413 |

FOREIGN PATENT DOCUMENTS 53-3092855 8/1978 Japan .................... 524/434

OTHER PUBLICATIONS

Chem. Abs. 83:61443g.
Chem. Abs. 89:25423r.

*Primary Examiner*—Allan Lieberman
*Assistant Examiner*—Patricia Short
*Attorney, Agent, or Firm*—Alan M. Doernberg; Gerhard H. Fuchs; Marianne M. Kriman

[57] ABSTRACT

A molding composition of a terephthalate polyester such as PET, a plasticizing material and a crystal nucleating agent. The nucleating agent is a powdered metal hydroxide such as aluminum hydroxide, which raises the $T_{cc}$ of the composition and permits reduced cycling time and enables higher molecular weight polymer to be used in the molding process.

15 Claims, No Drawings

INJECTION MOLDABLE POLY(ETHYLENE TEREPHTHALATE)

DESCRIPTION

1. Field of the Invention

This invention relates to the molding of crystallizable, linear, saturated polyester compositions and more particularly, to a composition wherein the temperature of crystallization of the polyester has been increased by the addition of an inorganic nucleating agent.

2. Description of the Prior Art

Thermoplastic, linear polyesters such as poly(ethylene terephthalate) and poly(butylene terephthalate) can be produced on a large scale at relatively low cost and have excellent physical properties in the crystalline state such as thermal stability due to their high melting points and low moisture absorption. In spite of these advantages poly(ethylene terephthalate) has found only limited use in the molding field due to the difficulty of converting them into crystallized articles with conventional molding equipment. Unmodified poly(ethylene terephthalate) crystallizes slowly from the melt making the process uneconomical and producing an article of non-uniform spherulite growth, low impact resistance, poor dimensional stability and rough surface. It also requires high molding temperatures which tend to degrade the polyester. Furthermore, the long mold cycle results in a long residence time of the polymer in the hot barrel of the processing equipment, severely degrading the polyester.

Strength, dimensional stability and toughness of poly(ethylene terephthalate) can be improved by incorporating reinforcing materials such as glass fibers or mica. However, when such reinforcing materials are used, as is recommended in U.S. Pat. No. 3,368,995, molding temperatures of from 120° C. to 200° C. are required to obtain articles with good mold release and glossy surface appearance. Such high temperatures cannot be obtained with conventional molding equipment because molds are heated with water and only can obtain molding temperatures of up to 110° C. Higher temperatures can be reached by means of oil-heated molding devices, but they are generally inconvenient, costly and hard to use.

These difficulties are well known and described in the prior art, and numerous attempts were made to overcome them. Netherlands Application No. 651174 recommends the addition of finely divided, inert, inorganic materials of particle size smaller than 2 microns to poly(ethylene terephthalate). Examples of the solid, inorganic substances that have been proposed are glass powder, carbon, talc, pyrophyllite, alkaline earth metal carbonates and metal oxides. These powders are introduced as seeding or nucleating agents to induce the formation of the first polyester crystals and thereby shorten the time of crystallization and the molding rate. Although these inert, inorganic additives produce some improvements in the density and dimensional stability of the shaped articles, the molding compositions so obtained still require molding temperatures above 120° C. and molding cycles of over 60 seconds.

Several other additives have been proposed in combination with an inert, inorganic nucleating agent: U.S. Pat. No. 3,583,935 discloses the addition of a mold release agent consisting of an organic ester and an alkali metal salt or alkaline earth metal salt of an organic acid to the poly(ethylene terephthalate). British Pat. No. 1,315,699 recommends the admixture of a sodium, lithium or barium salt of a mono- or polycarboxylic acid to a saturated linear polyester. U.S. Pat. No. 3,583,935 proposes a composition containing up to 3% of epoxides of the formula

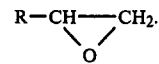

All these compositions tend to produce an improvement in the physical properties and surface appearance of the molded article, but they do not resolve the basic problems of molding poly(ethylene terephthalate)-based compositions as described hereinbefore, namely the need for high molding temperatures and long molding cycles.

U.S. Pat. Nos. 3,435,093; 3,516,957 and 3,639,527 and Netherland application Nos. 79-01605 and 79-01609 disclose the use of ionic copolymers of $\alpha,\beta$-unsaturated olefins and with $\alpha,\beta$-unsaturated carboxylic acids in which all or a portion of the pendant carboxyl functions form an alkali metal salt of the copolymer. These copolymers, when mixed with poly(ethylene terephthalate), are claimed to be effective in providing a composition that can be molded at temperatures below about 110° C. and still produce a molded article having a smooth and glossy surface. However, these nucleating agents tend to produce degradation of the polyester during the molding process while the compositions containing them have a reduced melt index, making it harder to fill thin cross-sections in complicated shapes.

In view of the ineffectiveness of the inorganic nucleating agents described in the prior art, our discovery that small amounts of certain solid, crystalline metal hydroxides produce an effective increase of the temperature of crystallization upon cooling from the melt (Tcc) of poly(ethylene terephthalate) (PET) and its analogs was therefore totally unexpected and fills an important need in the art of manufacturing articles of crystalline, saturated linear polyesters by molding the molten polymer composition.

Additions of aluminum hydroxide powder to poly(1,4-butylene terephthalate) molding compositions in amounts of over 5% by weight have been disclosed as flame retardant fillers in Japanese Patent No. 75-109945. Example 4 of U.S. Pat. No. 3,544,523 describes the use of precipitated aluminum hydroxide as one of several inorganic anticaking agents in the solid state polymerization of poly(ethylene terephthalate), where the resin is maintained at 250° C. for over 5 hours.

In none of these inventions was the surprising effectiveness of crystalline aluminum hydroxide as a nucleating agent for the saturated, linear polyesters recognized, and the processes involved in the above-mentioned patents are substantially different from the process of the present invention.

SUMMARY OF THE INVENTION

This invention relates to a molding composition comprising:

a. a thermoplastic, linear, saturated polyester of terephthalic acid, b. a plasticizer and c. a crystal nucleating agent, wherein the improvement consists in using as a nucleating agent a powdered crystalline metal hydroxide selected from the group of aluminum hydroxide, nickel hydroxide, indium hydroxide and copper hydroxide, in an amount sufficient to increase the crystallization temperature of the polyester composition in at least about 15° C. with regard to that of the mixture of a and b.

In addition, the composition may contain other ingredients commonly used in molding formulations and known to those skilled in the art, such as impact modifiers, mold release agents, chain extenders, lubricants, colorants, antioxidants, UV stabilizers, fillers and fiber reinforcement.

The nucleating metal hydroxide c should be present as a fine powder with grain size not exceeding 45 microns. Preferably, the nucleating agent is present in an amount from 0.1% to 4% by weight of the polyester. In a preferred embodiment the polyester is poly(ethylene terephthalate), the plasticizer is neopentyldiol dibenzoate and the metal hydroxide is aluminum hydroxide in an amount of 1% by weight of poly(ethylene terephthalate).

The present invention further relates to a process of molding linear, saturated polyester compositions from the melt by cooling in a water heated mold at temperatures not exceeding 110° C. To accomplish this, the crystallization must begin at as high a temperature as possible. According to the present invention, this purpose is achieved by the addition, prior to molding, of a powdered, crystalline metal hydroxide as described in c hereinbefore, which causes a substantial decrease in the molding cycle and an increase in the Tcc of the polyester composition of at least about 15° C. Tcc can be measured by Differential Scanning Calorimetry as described hereinafter.

The present invention also relates to shaped articles made by molding a thermoplastic polyester composition as described in this specification, wherein the surface qualities are substantially improved with regard to those of an article produced in absence of the nucleating agents object of this invention.

DETAILED DESCRIPTION OF THE INVENTION

The composition of the present invention includes linear, saturated polyesters of terephthalic acid. The preferred linear, saturated polyesters include poly(ethylene terephthalate), poly(1,4-butylene terephthalate), poly(1,6-hexylene terephthalate) and poly(1,4-cyclohexylenedimethylene terephthalate) with poly(ethylene terephthalate) being most preferred. The poly(ethylene terephthalate) for use with the present invention has an intrinsic viscosity range between about 0.4 and about 1.00, with a preferred intrinsic viscosity range between about 0.60 and 0.95. Intrinsic viscosity is obtained by extrapolation of viscosity values to zero concentration of solutions of poly(ethylene terephthalate) in a 60 to 40 weight/volume ratio of phenol and tetrachloroethane. The measurements are normalized to 25° C. The poly(ethylene terephthalate) can contain minor amounts, up to 5 percent, of other comonomers such as 1,4-cyclohexane dimethanol, 1,4-butanediol, neopentyldiol, diethylene glycol, glutaric acid or adipic acid.

A plasticizer is included in the composition of the present invention. The plasticizer allows crystallization of amorphous areas of the poly(ethylene terephthalate) to continue at lower temperatures than if a plasticizer were not used. This is particularly important in low temperature molding where the mold temperature is below the temperature at which crystallization is expected to stop. This temperature for pure poly(ethylene terephthalate) is about 125° C.

The plasticizers which can be used with the composition of the present invention are of the type known in the art which can be used with linear saturated polyester molding compositions preferably poly(ethylene terephthalate). A nonlimiting group of plasticizers are the following organic esters. The organic esters can be the product of an aromatic carboxylic acid of 7–11 carbon atoms containing at least one carboxyl group per aromatic nucleus, and an alcohol selected from those of the formula $(HOCH_2)\ R'_x$ wherein x is 1, 2 or 3 and R' is hydrocarbon radical of 2–15 carbon atoms (preferably 2–10 carbon atoms) or those of the formula $HO(R''O)_y R'''$ wherein y is a cardinal number between 1 and 8, R'' is a hydrocarbon radical of 2–15 carbon atoms (preferably 2–8 carbon atoms) and R''' is —H or a hydrocarbon radical of 2–20 carbon atoms (preferably 2–12 carbon atoms). The plasticizer used can also be the product of an aliphatic carboxylic acid of 1 to 20 carbon atoms containing 1–3 carboxyl groups, and an alcohol of the formula $HO(R''O)_y R'''$, wherein R'', R''' and y are defined above. Other plasticizers proposed for use with compositions object of this invention include the following: organic ketones of the formula

organic sulfones of the formula RSOOR; organic sulfoxides of the formula $R_2SO$; organic nitriles of the formula RCN; and organic amides of the formula

wherein R is a hydrocarbon radical group of 1–25 carbons, and R' is a hydrogen or hydrocarbon radical group of 1–25 carbon atoms. A preferred aliphatic plasticizer is dioctyl adipate, and a preferred aromatic plasticizer is neopentyldiol dibenzoate. Other aromatic plasticizers which can be used include: triethylene glycol dibenzoate, glyceryl tribenzoate, and pentaerythritol tetrabenzoate. In the present invention the amount of plasticizer added can be up to 15% by weight of the polyester. Preferably, there is between about 2% and 10% based on the weight of the poly(ethylene terephthalate) of plasticizer, and most preferably there is between about 3% and about 8% of plasticizer based on the weight of the poly(ethylene terephthalate).

The nucleating agents used in the present invention are solid crystalline metal hydroxides of the group consisting of aluminum hydroxide, nickel hydroxide, indium hydroxide and copper hydroxide. One or a mixture of these hydroxides can be used in the compositions encompassed by this invention. The hydroxides used are commercial grade products. In the examples they were sieved through mesh no. 325 which ascertains a grain size not greater than 45 microns, and were dried to a water content of less then 20 ppm. The preferred nucleating agents are aluminum hydroxide and nickel hydroxide; aluminum hydroxide being the most preferred.

The aluminum hydroxide used in this invention is added to the formulation in its hydrated form. The hydrate contains 30±5% water of hydration which is lost at the 275±25° C. temperature interval. Moisture regained by the dehydrated aluminum hydroxide is not effective in regenerating its nucleating capacity. Unless specifically indicated, the aluminum hydroxide mentioned in this specification is meant to be its hydrated form.

Table I shows the effectiveness of different metal hydroxides for increasing the $T_{cc}$ of poly(ethylene terephthalate) which for the unmodified resin is about 190° C.

TABLE I
METAL HYDROXIDES AS NUCLEATING AGENTS FOR PET
ALL AT 1% LEVEL, ALL DRIED AT 130° C.

| Metal Hydroxide | $T_{cc}$ °C. | I.V. | $T_{cc}$ Normalized to I.V. = 0.50 |
|---|---|---|---|
| COPPER | 208 | 0.68 | 217 |
| NICKEL | 204 | 0.64 | 212 |
| INDIUM | 209 | 0.55 | 212 |
| BARIUM | 195 | 0.73 | 206 |
| MAGNESIUM | 208 | 0.41 | 203 |

Table II shows that further elimination of water by drying at temperatures above 250° C. diminishes the nucleating capacity of aluminum hydroxide. This illustrates the distinctive character of the nucleating effect of these hydroxides with regard to that of alumina and other inorganic powders used as nucleating agents in the prior art.

TABLE II
EFFECT OF DRYING $Al(OH)_3.(H_2O)_n$ AT DIFFERENT TEMPERATURES

| Resin | % Nucleator | I. Viscos. | $T_{cc}$ °C. | $T_{cc}$ Normalized to I.V. = 0.50 |
|---|---|---|---|---|
| | | $Al(OH)_3$ dried at 130° C. | | |
| PET | 1.00 | 0.61 | 210 | 216 |
| | | $Al(OH)_3$ dried at 280° C. | | |
| PET | 1.00 | 0.56 | 203 | 205 |
| | | $Al(OH)_3$ dried at 325° C. | | |
| PET | 1.00 | 0.67 | 202 | 210 |
| | | $Al_2O_3$ type Porocel | | |
| PET | 1.00 | 0.79 | 196 | 211 |
| | | $Al_2O_3$ type - alumina | | |
| PET | 1.00 | 0.68 | 194 | 205 |
| | | Without Nucleator | | |
| PET | | 0.76 | 192 | 190 |

As a general condition we have found that the excellent nucleating ability of the compounds here described coincides with a property shared by all of them, namely the discontinuous loss of water in the 250° C.-300° C. temperature range (melt processing range of PET), either by dehydration or decomposition, which leaves behind a residue that is inert to the polyester composition and inocuous to the environment.

The nucleating agent is used in an amount sufficient to produce an increase of at least about 15° C. in the $T_{cc}$ with regard to that of the composition without the nucleator. The measurement of the $T_{cc}$ is done on a sample of about 7 milligrams which is placed in a Differential Scanning Calorimeter and heated at 10° C./min. from room temperature to 300° C. It is held at 300° C. for 5 minutes. The sample is then cooled at 10° C./min. The $T_{cc}$ appears as a sharp peak on the cooling branch of the curve.

The $T_{cc}$ for pure poly(ethylene terephthalate) having an intrinsic viscosity normalized to 0.50 is approximately 190° C. The following table shows the $T_{cc}$'s obtained with poly(ethylene terephthalate) of initial IV=0.95 and varying amounts of aluminum hydroxide.

TABLE III
EFFECT OF VARYING AMOUNTS OF ALUMINUM HYDROXIDE ON POLY(ETHYLENE TEREPHTHALATE)

| PET + Nucleator | $T_{cc}$ | I.V. of Product | $T_{cc}$ Normalized* to I.V. = 0.50 |
|---|---|---|---|
| 0.0% $Al(OH)_3$ | 188 | 0.7 | 190° C. |
| 0.5% $Al(OH)_3$ | 204 | 0.56 | 207 |
| 0.75% $Al(OH)_3$ | 207 | 0.52 | 208 |
| 1.00% $Al(OH)_3$ | 210 | 0.61 | 216 |

A variety of other nucleating agents can be used in combination with the metal hydroxide nucleators of this invention. For example, inorganic powders such as clays, calcium carbonate, carbon powder and the like, sodium stearate, sodium citrate, poly(alkylene oxides), and ionomers.

The following table illustrates the combination of $Al(OH)_3$ and poly(ethylene oxide) as nucleator for poly(ethylene terephthalate). $PEO_1$ has Mw=100,000, $PEO_2$ has Mw=15,000–20,000.

TABLE IV

| Polyester | Nucleating Agents | $T_{cc}$ | I.V. of Molded Product | $T_{cc}$ Normalized* to I.V. = 0.50 |
|---|---|---|---|---|
| PET | 0.75% $Al(OH)_3$ + 5% $PEO_1$ | 211 | 0.77 | 226 |
| " | 0.75% $Al(OH)_3$ | 204 | 0.81 | 221 |
| " | 1.00% $Al(OH)_3$ + 5% $PEO_1$ | 207 | 0.81 | 224 |
| " | 1.00% $Al(OH)_3$ | 207 | 0.69 | 217 |
| " | 0.75% $Al(OH)_3$ + 5% $PEO_2$ | 207 | 0.79 | 223 |
| " | 0.75% $Al(OH)_3$ | 212 | 0.74 | 225 |
| " | 1.00% $Al(OH)_3$ + 5% $PEO_2$ | 206 | 0.80 | 223 |
| " | 1.00% $Al(OH)_3$ | 206 | 0.70 | 217 |
| " | 0.50% $Al(OH)_3$ + 5% $PEO_2$ | 207 | 0.74 | 219 |

*In Tables III and IV, and in various other Tables and Examples that follow, measured $T_{cc}$ values have been normalized from the actual intrinsic viscosity (IV) to an intrinsic viscosity of 0.50 based upon the relationship between IV and $T_{cc}$ of sodium ionomer- or carboxylic ester-nucleated PET. The $T_{cc}$ of aluminum hydroxide-nucleated PET has been found, however, to be significantly less IV-dependant than sodium ionomer-or carboxylate-nucleated PET, thus accounting for the substantially different "normalized" $T_{cc}$ values in Tables III and IV for similar compositions of different PET IV values.

The compositions object of this invention may contain impact modifiers in an amount of up to 10%, and preferably from about 2% to about 6% based on the weight of the polyester resin. The impact modifiers that can be used include rubbery impact modifiers, e.g. polysiobutylene; high impact polystyrene (HIS); acrylonitrile-butadiene-styrene alloy (ABS); homopolymers of α,β-unsaturated olefins; homopolymers of methacrylic esters; copolymers of α,β-unsaturated olefins with α,β-unsaturated carboxylic acids or esters such as ethylene-acrylic acid, ethylene-methacrylic acid, ethylene-ethyl acrylate, ethylene-vinyl acetate; polyamides and ionic polymers (ionomers) obtained by partially or totally neutralizing the pendant carboxylic groups of organic polymers by metal ions. Examples of preferred impact modifiers used in compositions of the present invention are copolymers of ethylene and acrylic acid and terpolymers of ethylene, isobutyl methacrylate and methacrylic acid in which part of the acid groups are neutralized by sodium or zinc ions. Other examples of preferred impact modifiers are poly(methyl methacrylate); ABS resin and poly(ethylene propylene butadiene). Mixtures of similar or dissimilar types of the above mentioned impact modifiers may also be used.

We have found that the effect of the nucleating agent in increasing the $T_{cc}$ of the composition is enhanced when part of the hydroxide is incorporated into the ionomeric impact modifier. The exact nature of this effect is not understood, but it cannot be attributed merely to the neutralization of the ionomer by the aluminum ion. In comparative experiments wherein the free carboxylic acid groups of the ionomer were reacted with aluminum formate or with aluminum isopropionate, the effect of the ionomer-Al(OH)$_3$ mixture could not be reproduced. The data given in Table V illustrate the point.

TABLE V

| Polyester | EAA* neutralized with | $T_{ch}$** °C. | $T_{cc}$ °C. | I.V. of Product |
|---|---|---|---|---|
| PET IV = 0.5 | NaOH | 120 | 213 | 0.48 |
| " | Al formate | 126 | 202 | 0.49 |
| " | NaOH and Al formate | 125 | 206 | 0.50 |

*Ethylene acrylic acid copolymer
**$T_{ch}$ = temperature of crystallization upon heating.

Good impact modification is achieved with sodium ion percentage of 0.028% by weight of PET or lower, which is below the level of sodium at which the ionomer is said to affect the crystallization of PET according to Belgian Patent No. 874,469.

The composition can contain a polyepoxide. The epoxy resins which can be used include an epoxy formed from bisphenol-A and glycidyl ether, or polyepoxides obtained by reacting orthocresol novolac and epichlorohydrin. Preferred polyepoxides are epoxy cresol novalac resins sold under the trademarks ECN 1235, 1273 and 1299 produced by the Ciba-Geigy Corporation. Preferably, there is up to about 3% and more preferably 0.5% to about 1.5% based on the weight of the poly(ethylene terephthalate) of polyepoxide. The polyepoxides act as chain extenders and help to compensate for poly(ethylene terephthalate) chains broken by hydrolysis.

In addition to the components discussed above, the compositions of the present invention can contain additives commonly employed with polyester resins, such as colorants, mold release agents, antioxidants, flame retarding agents, ultraviolet light stabilizers and the like.

Any suitable filler or reinforcing agent can be used. The fillers may optionally be treated with various coupling agents or adhesion promoters as is known to those skilled in the art. Examples of fillers include glass fibers, alumina, feldspar, asbestos, talc, calcium carbonates, clay, carbon black, quartz, novaculite and other forms of silica, kaolinite, bentonite, garnet, mica, saponite, beidellite, etc. The foregoing recited fillers are illustrative only and are not meant to limit the scope of the fillers that can be utilized in this invention. There is up to 150% by weight of the poly(ethylene terephthalate) of filler, and preferably about 30% to about 90% by weight of the poly(ethylene terephthalate) of filler. The most preferred fillers are glass fibers.

The following examples are illustrative of molding compositions and procedures encompassed by the present invention.

EXAMPLE 1

A molding composition was prepared with the following ingredients:

a. 1600 g poly(ethylene terephthalate) having intrinsic viscosity (IV) of 0.95, 480 g fiberglass type 3540 and 16 g aluminum hydroxide were mixed and dried at 120° C. to a water content of less than 20 ppm.

b. 100 g EAA 455 neutralized with 8% by weight of aluminum hydroxide. EAA 455 is an ethylene acrylic acid copolymer produced by Dow Chemical Corporation.

c. 65 g Benzoflex ® 312 mixed with 20 g Epoxy Cresol Novolac resin 1299. Benzoflex 312 is neopentyl diol dibenzoate. Epoxy 1299 is a polyfunctional epoxy resin having about 3 epoxy groups per molecule. It is manufactured by Ciba-Geigy Corporation.

Ingredients a, b and c are mixed at about room temperature, passed through a single screw extruder at temperatures of between 265° C. and 275° C., cooled in air stream and pelletized.

EXAMPLES 2–6

In the examples that follow Surlyn ® 1855 and Surlyn ® 1856 were used as impact modifiers. These are terpolymers of ethylene, methacrylic acid and isobutyl methacrylate in which part of the carboxylic functions are neutralized by zinc ions and sodium ions respectively. They are described in detail in the bulletin *Surlyn Ionomer Resin E 1488* published by the DuPont Company. In a preferred embodiment of this invention the ground and dried ionomer resin is mixed with about 6% of its weight of powdered, vacuum dried aluminum hydroxide. The mixture is extruded and pelletized. The preparation of the molding composition is otherwise similar to that given in Example 1.

TABLE VI

| Ingredient | Ex. 2 % | Ex. 3 % | Ex. 4 % | Ex. 5 % | Ex. 6 % |
|---|---|---|---|---|---|
| PET (IV = 0.53) | 70.2 | — | 66.0 | — | — |
| Pet (IV = 0.95) | — | 70.2 | — | 61.3 | 62.5 |
| Fiberglass | 21.0 | 21.0 | 29.4 | 29.8 | 30.4 |
| Aluminum hydroxide | 0.7 | 0.7 | 0.7 | 0.6 | 0.6 |
| Surlyn ® 1855 + 5.5% Al(OH)$_3$ | 4.4 | 4.4 | — | — | — |
| Surlyn ® 1856 + 5.5% Al(OH)$_3$ | — | — | — | 1.9 | 1.9 |
| EAA 455 + 5.5% Al(OH)$_3$ | — | — | — | 1.9 | — |
| Benzoflex 312 | 2.8 | 2.8 | 3.9 | 3.7 | 3.8 |
| Epoxy ECN 1299 | 0.9 | 0.9 | — | 0.8 | 0.8 |

Extrusion was performed in a 3 zone extruder using a 3:1 screw operating at 40 RPM. The temperature profile is preferably 260° C. in zone 1 and 2, and 265° C. in zone 3. The two faces of the mold were set at temperatures below 110° C. and the total molding cycle was 17 seconds in examples 2 and 3, and 15 seconds in examples 4, 5 and 6.

Table VII shows properties of molded articles obtained by the use of some of the formulations given.

TABLE VII

| | Ex. 3 | Ex. 4 | Ex. 5 | Ex. 6 |
|---|---|---|---|---|
| IV of molded article | 0.86 | 0.58 | 0.57 | 0.57 |
| $T_{cc}$ of molded article °C. | 209 | 208 | 208 | 212 |
| $T_{cc}$ normalized to IV = 0.50, °C. | 229 | 212 | 211 | 216 |
| Breaking strength. PSI | 15560 | 19540 | 1 450 | 19340 |
| Breaking elongation % | 5.0 | 4.4 | 4.6 | 5.1 |
| Tensile modules PSI × 10$^6$ | 1.000 | 1.284 | 1.264 | 1.383 |

TABLE VII-continued

|  | Ex. 3 | Ex. 4 | Ex. 5 | Ex. 6 |
|---|---|---|---|---|
| Molding cycle sec. | 17 | 15 | 15 | 15 |

Various mixtures, similar to that of Example 6 but with different impact modifiers, were also prepared, molded and tested for tensile (breaking) strength. Mixtures using as impact modifier either polymethylmethacrylate or poly(acrylonitrile-butadiene-styrene) (ABS) gave higher tensile strengths than the mixture of Example 6. A mixture using poly(ethylene-propylene-butadiene) gave a tensile strength slightly lower than the mixture of Example 6. Mixtures using polyethylene or ethylene-propylene rubber with 6% grafted acrylic acid gave lower and much lower tensile strengths than the mixture of Example 6.

EXAMPLE 7 AND COMPARATIVE EXAMPLE 8

Another feature of the present invention is the improvement in surface quality obtained in molded articles containing the novel nucleating agent. In example 7 and comparative example 8 the surface gloss of a molded article prepared with a composition containing aluminum hydroxide is compared with that of an article of identical composition from which aluminum hydroxide has been omitted. The test pieces were prepared in the same manner and under identical conditions as described for examples 1 through 6.

EXAMPLE 7 AND COMPARATIVE EXAMPLE 8

Another feature of the present invention is the improvement in surface quality obtained in molded articles containing the novel nucleating agent. In example 7 and comparative example 8 the surface gloss of a molded article prepared with a composition containing aluminum hydroxide is compared with that of an article of identical composition from which aluminum hydroxide has been omitted. The test pieces were prepared in the same manner and under identical conditions as described for examples 1 through 6.

EXAMPLE 7

800 g Poly(ethylene terephthalate) of initial IV = 0.95
389 g fiber glass
8 g aluminum hydroxide
50 g Surlyn ® 1856 compounded with 6% of its weight of aluminum hydroxide
48 g Benzoflex ®
10 g Epoxy 1299

EXAMPLE 8

800 g Poly(ethylene terephthalate) of initial IV = 0.95
389 g fiber glass
50 g Surlyn ® 1856
48 g Benzoflex
10 g Epoxy 1299

Mold temperature for both formulations was 105° C. The gloss of the test pieces was measured by means of a Hunterlab Colorimeter Model D 25P-2 using the 60 degree angle optical unit of a Modular Glossmeter accessory.

A total of 52 measurements showed readings of 41±9 for Example 7 against 18±3 for Comparative Example 8.

In test series 3-$C_1$ through 3-$C_4$ and 5-CA through 5-CG, the formulations of Example 7 and Comparative Example 8 were molded and subjected to comparative experiments in order to show the effect of molding conditions on compositions differing only in the presence of $Al(OH)_3$. The results are shown in Table VIII.

TABLE VIII

| Composition | Test | IV of Molded Article | $T_{cc}$ °C. | Gloss at 60° | Mold Cycle sec. | Temp. °C. |
|---|---|---|---|---|---|---|
| Example 8 | 3-$C_1$ | 0.57 | 202 | 15.6 | 15 | 105 |
|  | -$C_2$ | 0.49 | 203 | 20.0 | 15 | 105 |
|  | -$C_3$ | 0.55 | 203 | 19.1 | 15 | 105 |
|  | -$C_4$ | 0.69 | 202 | 18.3 | 13 | 105 |
| Example 7 | 5-CA | 0.62 | 207 | 35.9 | 15 | 105 |
|  | -CB | 0.63 | 213 | 42.0 | 25 | 105 |
|  | -CC | 0.68 | 208 | 41.1 | 15 | 99 |
|  | -CD | 0.62 | 214 | 42.2 | 25 | 99 |
|  | -CE | 0.66 | 212 | 37.8 | 15 | 99 |
|  | -CF | 0.62 | 215 | 41.2 | 25 | 99 |
|  | -CG | 0.64 | 209 | 44.0 | 13 | 99 |

In articles molded from the composition of Comparative Example 8 (test series 3-$C_1$ through 3-$C_4$), acceptable surface quality could not be obtained below 100° C. In contrast, test series 5-CA through 5-CG using the composition of Example 7 shows that neither the increased mold temperature, nor the increased molding cycle produces an improvement in the surface quality of the molded article, which is substantially better than that obtained without the nucleator. The gloss values are averages of 5 specimens obtained with the same equipment and method as described in the foregoing gloss comparison of Examples 7 and 8.

EXAMPLE 9 AND COMPARATIVE EXAMPLE 10

In the following series of experiments, Example 9 containing PET (initial IV=0.95), 30% by weight of PET of fiber glass, 6% by weight of PET of Benzoflex ® plasticizer and 1% by weight of PET of aluminum hydroxide was compared with Example 10 of identical composition in which the aluminum hydroxide was omitted. They were extruded under the same conditions and molding under the same conditions was attempted but unsuccessful with the unnucleated formulation of Comparative Example 10.

TABLE IX

| Composition | Conditions | IV | $T_{cc}$ °C. | $T_{cc}$ °C. normalized to IV = 0.50 | Molding Cycle sec |
|---|---|---|---|---|---|
| Example 9 | Extruded | 0.74 | 207 | 220 | N/A |
| Example 9 | Molded cond A | 0.58 | 208 | 212 | 15 |
| Example 9 | Molded cond B | 0.53 | 208 | 210 | 20 |
| Example 9 | Molded cond C | 0.55 | 207 | 210 | 15 |
| Example 10 | Extruded | 0.80 | 182 | 187 | N/A |
| Example 10 | Molded cond A | 0.75 | 189 | 192 | could not be ejected |

The examples given in this specification describe the best mode of carrying out the invention but should not be construed as limiting in regard to composition or procedure, and obvious modifications may occur to those skilled in the art.

The scope of the invention is to be determined from the following claims.

What is claimed is:

1. In a molding composition comprising a. a thermoplastic, saturated, linear polyester of terephthalic acid,
b. a plasticizing material and
c. a crystal nucleating agent, the improvement which consists in using as the nucleating agent a powdered crystalline metal hydroxide of grain size not exceeding 45 microns, selected from the group of hydrated aluminum hydroxide containing 30±5% water of hydration, nickel hydroxide, indium hydroxide and copper hydroxide in an amount sufficient to increase the crystallization temperature of an article molded from the polyester composition by at least about 15° C. with regard to that of the mixture of a and b.

2. A molding composition as described in claim 1, wherein the polyester is selected from the group of poly(ethylene terephthalate), poly(1,4-butylene terephthalate) poly(1,6-hexylene terephthalate) and poly(1,4-cyclohexylidenedimethylene terephthalate), the intrinsic viscosity of said polyester being at least 0.4.

3. A molding composition as described in claim 1, wherein the polyester is poly(ethylene terephthalate) having intrinsic viscosity in the range of about 0.4 to about 1.0.

4. A molding composition as described in claim 1, wherein the nucleating agent is hydrated aluminum hydroxide containing 30±5% water of hydration.

5. A molding composition as described in claim 1, wherein the plasticizer is present in an amount from about 0.1 to 15% by weight of the polyester resin.

6. A molding composition as described in claim 1, further comprising from 15% to 150% by weight of the polyester of glass fiber reinforcement.

7. A molding composition as described in claim 1, also comprising one or more components selected from the group consisting of fillers, impact modifiers chain extenders, colorants, mold release agents antioxidants, fire retardants and lubricants.

8. A molding composition as described in claim 7 wherein the chain extender is an epoxy resin.

9. A molding composition as described in claim 7 wherein the impact modifier is a copolymer derived from an alpha-olefin and an alpha-olefinic carboxylic acid in which the carboxylic functions have been partially or totally neutralized by metal ions.

10. A molding composition as described in claim 9 wherein the impact modifier is a terpolymer derived from an alpha-olefin, an alpha-olefinic carboxylic acid and an alpha-olefinic carboxylic ester in which the free carboxylic acid functions have been partially or totally neutralized by metal ions.

11. A molding composition as described in claim 10 wherein
a. the terpolymer is derived from ethylene, methacrylic acid and isobutyl methacrylate and
b. from 15 to 70% of the free carboxylic acid groups are neutralized by sodium or zinc ions.

12. A molding composition as described in claim 7 wherein the impact modifier is an acrylonitrile-butadiene-styrene alloy.

13. A molding composition as described in claim 7 wherein the impact modifier is poly(methyl methacrylate).

14. A shaped article of a thermoplastic composition as described in claim 1, 6 or 7.

15. In the process of producing shaped articles of high surface quality and gloss by cooling in a mold a molten thermoplastic polyester composition comprising:
a. a polyester of terephthalic acid with diol selected from the group of ethanediol, 1,4-butanediol, and hexanediol and 1,4-cyclohexanedimethanol or mixtures or copolymers thereof,
b. a plasticizing material and
c. a nucleating agent,
the improvement which comprises using as the nucleating agent a powdered crystalline metal hydroxide of grain size not exceeding 45 microns, selected from the group of hydrated aluminum hydroxide containing 30±5% water of hydration, nickel hydroxide, indium hydroxide and copper hydroxide in an amount sufficient to increase the crystallization temperature of the polyester composition by at least about 15° C. with regard to the mixture of a and b.

* * * * *